United States Patent [19]

Takahashi et al.

[11] Patent Number: 4,546,168

[45] Date of Patent: Oct. 8, 1985

[54] THERMOSETTING RESIN COMPOSITION COMPRISING (1) DICYANAMIDE, (2) POLYVALENT IMIDE AND (3) POLYMERIZABLE COMPOUND

[75] Inventors: Akio Takahashi, Hitachiota; Takeshi Shimazaki, Hitachi; Motoyo Wajima, Hitachi; Hirosada Morishita, Hitachi, all of Japan

[73] Assignee: Hitachi, Ltd., Tokyo, Japan

[21] Appl. No.: 639,092

[22] Filed: Aug. 9, 1984

Related U.S. Application Data

[62] Division of Ser. No. 435,766, Oct. 20, 1982, Pat. No. 4,482,703.

[30] Foreign Application Priority Data

Oct. 23, 1981 [JP] Japan ................................ 56-168787

[51] Int. Cl.$^4$ ............................................. C08G 73/10

[52] U.S. Cl. ...................... 528/107; 525/502; 525/504; 525/529; 525/533; 525/534; 528/117; 528/119; 528/163; 528/164; 528/170; 528/321; 528/322

[58] Field of Search ............... 528/107, 117, 119, 163, 528/164, 170, 321, 322; 525/502, 504, 529, 533, 534

[56] References Cited

U.S. PATENT DOCUMENTS 4,482,703 11/1984 Takahashi et al. ................ 528/322

*Primary Examiner*—Harold D. Anderson
*Attorney, Agent, or Firm*—Antonelli, Terry & Wands

[57] ABSTRACT

A thermosetting resin composition comprising (A) at least one dicyanamide compound and (B) at least one polyvalent imide having one or more unsaturated bonds and, if necessary (C) at least one polymerizable compound of epoxy compounds, phenolic compounds and triallyl isocyanurate compounds, and a prepolymer thereof obtained by subjecting the composition to a preliminary reaction with heating to the B stage can give a cured product having excellent heat resistance of class C and flexibility.

8 Claims, No Drawings

THERMOSETTING RESIN COMPOSITION COMPRISING (1) DICYANAMIDE, (2) POLYVALENT IMIDE AND (3) POLYMERIZABLE COMPOUND

This is a division of application Ser. No. 435,766, filed Oct. 20, 1982, now U.S. Pat. No. 4,482,703.

BACKGROUND OF THE INVENTION

1. Field of the Invention

This invention relates to a thermosetting resin composition, a prepolymer thereof and a cured product thereof, said composition undergoing curing reaction by heating to proceed stage changes from A stage to B stage and then to C stage and particularly gives a cured product excellent in heat resistance and flexibility.

2. Description of the Prior Art

As resin molding materials having heat resistance of class H, addition polymerization type polyimides such as bismaleimide and the like are well known. This maleimide is often used in combination with a diamine or an epoxy resin. According to the specification of British Pat. No. 1,322,332, a heat-resistant polymer having isomelamine rings was provided by polymerizing a dicyanamide compound, in order to further improve the heat resistance. However, a defect of this polymer is that it is difficult to subject to molding using a usual mold or laminate molding because the polymerization reaction proceeds relatively rapidly. This is because the production of a prepolymer itself is difficult or because even if a prepolymer can be produced, no sufficient fluidity can be retained for the time required for molding because the curing reaction proceeds rapidly.

SUMMARY OF THE INVENTION

Objects of this invention are to provide a thermosetting resin composition giving a cured product having heat resistace of class C or more and excellent flexibility, a prepolymer thereof and a cured product thereof.

This invention provides a thermosetting resin composition comprising (A) at least one dicyanamide compound represented by the formula:

NCHN—Y—NHCN (I)

wherein Y is a divalent organic group having an aromatic ring, and (B) at least one polyvalent imide having one or more unsaturated bonds.

In this invention, the reaction of the aforesaid dicyanamide compound with the aforesaid polyvalent imide yields a prepolymer and a final cured product which contain structural units having isomelamine rings and imide rings represented by the following formulas (II) and (III). That is to say, there are produced a prepolymer and a cured product having a repeating unit in which an isomelamine ring and an imide ring are directly combined and represented by the formula:

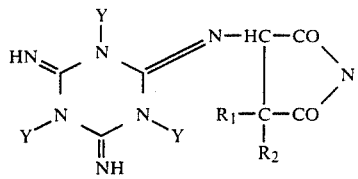

wherein $R_1$ and $R_2$ are independently hydrogen, an alkyl group or a halogen atom, and a repeating unit in which an isomelamine ring formed by radical polymerization of a dicyanamide compound and a polyvalent imide is not directly combined with an imide ring and represented by the formula:

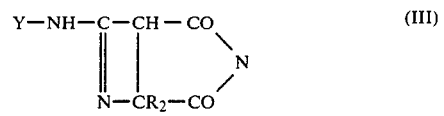

wherein $R_2$ is hydrogen, an alkyl group or a halogen atom.

As the dicyanamide compound represented by the above general formula and used in this invention, there may be used alone or as a mixture thereof, for example, 4,4'-dicyanamidodicyclohexylmethane, 1,4-dicyanamidocyclohexane, 2,6-dicyanamidopyridine, m-phenylene dicyanamide, p-phenylene dicyanamide, 4,4'-dicyanamidodiphenylmethane, 2,2'-bis(4-cyanamidophenyl)propane, 4,4'-dicyanamidophenyloxide, 4,4'-dicyanamidodiphenylsulfone, bis(4-cyanamidophenyl)phosphine oxide, bis(4-cyanamidophenyl)phenylphosphine oxide, bis(4-cyanamidophenyl)methylamine, 1,5-dicyanamidonaphthalene, m-xylylene dicyanamide, p-xylene dicyanamide, hexamethylene dicyanamide, 6,6'-dicyanamido-2,2'-dipyridyl, 4,4'-dicyanamidobenzophenone, 4,4'-dicyanamidoazobenzene, bis(4-cyanamidophenyl)phenylmethane, 1,1-bis(4-cyanamidophenyl)cyclohexane, 1,1-bis(4-cyanamido-3-methylphenyl)-1,3,4-oxadiazol, 4,4'-dicyanamidodiphenylether, 4,4'-bis(p-cyanamidophenyl)-2,2'-dithiazol, m-bis(4-p-cyanamidophenyl-2-thiazolyl)benzene, 4,4'-dicyanamidobenzanilide, 4,4'-dicyanamidophenyl benzoate, 2,2'-bis[4-(4-cyanamidophenoxy)phenyl]propane, 2,2'-bis[3-methyl-4-(4-cyanamidophenoxy)phenyl]propane, 2,2-bis[3-ethyl-4-(4-cyanamidophenoxy)phenyl]propane, 2,2-bis[3-propyl-4-(4-cyanamidophenoxy)phenyl]propane, 2,2-bis[3-isopropyl-4-(4-cyanamidophenoxy)phenyl]propane, bis[4-(4-cyanamidophenoxy)phenyl]methane, and cyanamide-terminated sulfone ether oligomers represented by the following formula:

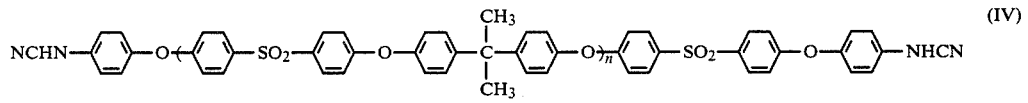

wherein n is zero to 3. Dicyanamide compounds having an aromatic ring as Y in the above formula (I) are particularly preferred from the viewpoint of the heat resistance.

As the polyvalent imide having one or more unsaturated bonds, there may be used, for example, bisimides such as bismaleimides obtained by reacting an acid anhydride such as maleic anhydride, citraconic anhydride, itaconic anhydride, pyrocinchonic anhydride, dichloromaleic anhydride, or Diels-Alder adducts of any of the above-mentioned acid anhydride with a dicyclodiene, with a diamine, for example, N,N'-methylene bismaleimide, N,N'-ethylene bismaleimide, N,N'-hexamethylene bismaleimide, N,N'-trimethylene bismaleimide, N,N'-m-phenylene bismaleimide, N,N'-p-phenylene bismaleimide, N,N'-4,4'-diphenylmethane bismaleimide, N,N'-4,4'-diphenylether bismaleimide, N,N'-methylenebis(3-chloro-p-phenylene)bismaleimide, N,N'-4,4'-diphenylsulfone bismaleimide, N,N'-4,4'-dicyclohexylmethane bismaleimide, N,N'-α,α'-4,4'-dimethylenecyclohexane bismaleimide, N,N'-m-xylene bismaleimide, N,N'-4,4'-diphenylcyclohexane bismaleimide and the like, and polyvalent maleimides obtained by reacting maleic anhydride with a condensate of aniline with formaldehyde and represented by the following formula:

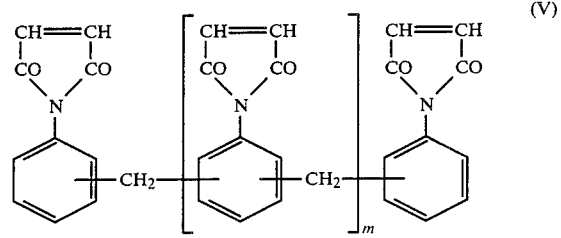

(V)

wherein m is zero to 3.

In this invention, the following monomaleimide compounds may be co-used. For example, there may be co-used at least one of monomaleimide compounds such as N-methylmaleimide, N-ethylmaleimide, N-propylmaleimide, N-butylmaleimide, N-allylmaleimide, N-vinylmaleimide, N-phenylmaleimide, N-3-chlorophenylmaleimide, N-o-tolylmaleimide, N-m-tolylmaleimide, N-p-tolylmaleimide, N-o-methoxyphenylmaleimide, N-m-methoxyphenylmaleimide, N-p-methoxyphenylmaleimide, N-benzylmaleimide, N-pyridylmaleimide, N-hydroxyphenylmaleimide, N-acetoxyphenylmaleimide, N-dichlorophenylmaleimide, N-benzophenone maleimide, N-diphenylethermaleimide, N-acetylphenylmaleimide, N-cyclohexylmaleimide and the like.

Further, the following polyvalent imide prepolymers may also be used. That is to say, there may be used prepolymers obtained by reacting any of the polyvalent imides described above with a diamine, an epoxy compound, a phenolic compound or triallyl isocyanurate. Here, as the epoxy compound, there is used at least one of, for example, bifunctional epoxy compounds such a diglycidyl ether of bisphenol A, 3,4-epoxycyclohexylmethyl-3,4-epoxycyclohexane carboxylate, 4,4'-(1,2-epoxyethyl)biphenyl, 4,4'-di(1,2-epoxyethyl)diphenylether, resorcin diglycidyl ether, bis(2,3-epoxycyclopentyl)ether, N,N'-m-phenylenebis(4,5-epoxy-1,2-cyclohexanedicarbodiimide and the like; tri- or higher functional epoxy compounds such as 1,3,5-tri(1,2-epoxyethyl)benzene, tetraglycidoxytetraphenylethane, polyglycidyl ether of phenol-formaldehyde novolak resin, and the like; epoxy compounds having a hydrantoin skeleton; and epoxy compounds containing one or more halogen atoms, such as brominated epoxy compounds and the like. As the phenolic compound, there may be used liquid or resinous condensates obtained by reacting at least one of phenol, cresol, m-cresol, p-cresol, 2,5-xylenol, 2,6-xylenol, o-chlorophenol, m-chlorophenol, p-chlorophenol, o-phenylphenol, m-phenylphenol, p-phenylphenol, saligenin, bisphenol A and the like with formalin or parafolmaldehyde in the presence of an acidic or alkaline catalyst, diphenyl ether resins, xylene-modified phenolic resins, parahydroxypolystyrene resins, brominated parahydroxypolystyrene resins, bisphenol A-furfural resins, etc. There may be used besides them prepolymers obtained by directly reacting bisphenol A, resorcinol, catechol, hydroquinone, pyrogallol or the like with a polyvalent maleimide.

Even if the mixing proportion of the dicyanamide compound to the polyvalent imide is varied over a relatively wide range, a cured product good in heat resistance can be obtained. The flexibility of the resulting cured product tends to be lowered when the ratio between the dicyanamide compound and the polyvalent imide each other is extremely high. From the viewpoint of the solubility of the prepolymer of the dicyanamide compound and the polyvalent imide in solvents, it is preferable to increase the amount of the dicyanamide compound. In general, the amount of the polyvalent imide is suitably in the range from 10 to 1 mole per 1 to 10 moles of the dicyanamide compound. It is more preferable to use the polyvalent imide in the range from 3 to 7 moles per 7 to 3 moles of the dicyanamide compound.

The resin composition of this invention can react by heating to be cured as a solution or varnish in an organic solvent or in the absence of any solvent. The latter reaction is a so-called melt reaction. The reaction using a solvent can preferably be effected by heating at about 50°-150° C., followed by raising the temperature to about 150°-220° C. On the other hand, the melt reaction can be effected by heating at a relatively high temperature, namely, about 150°-220° C. When the prepolymer is obtained, heating is stopped at the time when the reactants are in B stage. In the case of the reaction in a solvent, heating is stopped before a solid (a cured product) deposits. In this invention, the cured product may directly be produced without once stopping the reaction at B stage. As the solvent, there may be used, for example, methyl ethyl ketone, methyl acetyl ketone, 2-methoxyethanol, 2-(methoxymethoxy)ethanol, 2-isoproxyethanol, 2-(ethoxyethoxy)ethanol, dioxane, dimethyldioxane, monopropylene glycol methyl ether, N,N-dimethylformamide, N,N-dimethylacetamide, N-methyl-2-pyrrolidone and the like. These solvents may be used alone or as a mixture thereof. Particularly preferable are methyl ethyl ketone, 2-methoxyethanol, N,N-dimethylformamide, N-methyl-2-pyrrolidone and dioxane.

In this invention, the curing properties and flexibility of the cured product can be improved by co-using a diamine. The diamine may be mixed directly with a system consisting of a dicyanamide compound and a polyvalent imide or used as a mixture prepared by mixing a dicyanamide compound with a product of the preliminary reaction of the diamine with a polyvalent imide or a polyvalent imide prepolymer. Here, the preliminary reaction is, in general, sufficiently be effected by heating at 50°-180° C. for about 10-120 minutes in a solvent or in the absence of any solvent. A ternary prepolymer may also be produced by adding a diamine in synthesizing a polyvalent imide prepolymer. As the diamine, there may be used at least one of 4,4'-diaminodicyclohexylmethane, 1,4-diaminocyclohexane, 2,6-diaminopyridine, m-phenylenediamine, p-phenylenediamine, 4,4'-diaminodiphenylmethane, 2,2'-bis(4-aminophenyl)propane, benzidine, 4,4'-diaminophenyloxide, 4,4'-diaminophenylsulfone, bis(4-aminophenyl)methylphosphine oxide, bis(4-aminophenyl)phenylphosphine oxide, bis(4-aminophenyl)methylamine, 1,5-diaminonaphthalene, m-xylylenediamine, p-xylylenediamine, hexamethylenediamine, 6,6'-diamino-2,2'-dipyridyl, 4,4'-diaminobenzophenone, 4,4'-diaminoazobenzene, bis(4-aminophenyl)phenylmethane, 1,1-bis(4-aminophenyl)cyclohexane, 1,1-bis(4-amino-3-methylphenyl)cyclohexane, 2,5-bis(m-aminophenyl)-1,3,4-oxadiazole, 2,5-bis(p-aminophenyl)-1,3,4-oxadiazole, 2,5-bis(m-aminophenyl)thiazolo(4,5-d)-thiazole, 5,5-di(m-aminophenyl)-(2,2')bis(1,3,4-oxadiazolyl), 4,4'-diaminodiphenyl ether, 4,4'-bis(p-aminophenyl)-2,2'-dithiazole, m-bis(4-p-aminophenyl-2-thiazolyl)benzene, 4,4'-diaminobenzanilide, 4,4'-diaminophenyl benzoate, N,N'-bis(4-aminobenzyl)-p-phenylenediamine, 4,4'-methylene-bis(2-dichloroaniline), benzoguanamine, methylguanamine and the like. The mixed amount of the diamine is, in general, suitably in the range from 1.0 to 30% by weight, preferably 3.0 to 20% by weight based on the weight of the composition.

In this invention, curing catalysts such as conventional curing catalysts for maleimides or curing catalysts for epoxy resins may also be used in order to accelerate the reaction. Concrete examples of the curing catalysts include imidazole series compounds such as tetramethylbutanediamine, benzyldimethylamine, 2,4,6-tris(dimethylaminophenol), tetramethylguanidine, guanidine, 2-methylimidazole, 2-ethyl-4-methylimidazole, 2-ethylimidazole, 2-isopropylimidazole, 2-undecylimidazole, 2-heptadecylimidazole, 2-phenylimidazole, 2,4'-dimethylimidazole and the like; azine derivatives, onium salts, trimellitates and nitrylethyl derivatives of the above-mentioned imidazole compounds; tetraphenylphosphonium tetraphenylborate; tetraphenylammonium tetraphenylborate; tetrabutylammonium tetraphenylborate; tetramethylammonium fluoride; etc. The using amount of these curing catalysts is generally suitably 0.1 to 5% by weight based on the weight of the composition.

The resin composition of this invention may contain one or more conventional inorganic fillers, fire retardants, flexibility-imparting agents, antioxidants, pigments, coupling reagents, mold-releasing agents, and the like.

At least one polymerizable compound selected from epoxy compounds, phenolic compounds and triallyl isocyanurate series compounds may additionally be used in combination with the resin composition of this invention described above in detail. Concrete examples of the polymerizable compound include the same compounds as described earlier. Its mixing proportion is suitably 2 to 50% by weight in usual.

The resin composition of this invention can be made useful as a varnish for impregnation, lamination, adhesion, coating films, films and prepregs by making it into a solution (varnish) in an organic solvent. On the other hand, in a form containing no solvent, said resin composition can be used as powder for molding. As the organic solvent, there may be used many solvents such as acetone, methyl ethyl ketone, methyl cellosolve, N-methyl-2-pyrrolidone, N,N'-dimethylformamide, N,N-dimethylacetamide and the like. The resin composition can be retained at the B stage by a preliminary reaction. The B stage resin is a so-called prepolymer which is advantageous in that it has a further improved solubility in organic solvents and is readily soluble even in a low boiling solvent.

EXAMPLE 1

| (A) | 4,4'-Dicyanamidodiphenyl-methane | 60 parts by weight (0.24 mole) |
| --- | --- | --- |
| (B) | N,N'—4,4'-Diphenylmethane bismaleimide | 40 parts by weight (0.11 mole) |

The above-mentioned two components were dissolved (solid content: 50% by weight) in methyl Cellosolve and reacted at 70° to 110° C. for about 40 minutes to obtain a prepolymer which was soluble in methyl ethyl ketone and methyl Cellosolve even at ordinary temperatures. The infrared absorption spectrum of the prepolymer was measured to show an absorption due to the isomelamine ring at 1620 cm$^{-1}$ and an absorption due to the maleimide ring at 1780 cm$^{-1}$.

Next, 0.2 part by weight of 2-ethyl-4-methylimidazole was added to the prepolymer, and the methyl Cellosolve was removed at 120° C., after which the residue was allowed to react at 170° to 200° C. for 80 minutes to obtain an insoluble and infusible cured product.

EXAMPLE 2

| (A) | 4,4'-Dicyanamidodiphenylether | 50 parts by weight (0.2 mole) |
| --- | --- | --- |
| (B) | N,N'—Diphenylether bismaleimide | 50 parts by weight (0.14 mole) |

The above-mentioned two components were mixed at 140° C. and then reacted at 170° to 200° C. for 120 minutes to obtain an insoluble and infusible cured product directly. The infrared absorption spectrum of the cured product was measured to show an absorption due to the isomelamine ring at 1620 cm$^{-1}$ and an absorption due to the maleimide ring at 1780 cm$^{-1}$.

EXAMPLE 3

| (A) | 2,2'-Bis[4-(4-cyanamidophenoxy)-phenyl]propane | 70 parts by weight (0.1 mole) |
| --- | --- | --- |
| (B) | N,N'—Diphenylmethane bismaleimide | 30 parts by weight (0.08 mole) |

The above-mentioned two components were dissolved (solid content: 50% by weight) in methyl Cellosolve and reacted at 80° to 110° C. for 30 minutes to obtain a prepolymer which was soluble in methyl ethyl ketone, methyl Cellosolve, dimethylformamide even at ordinary temperatures.

For the prepolymer, absorptions due to the isomelamine ring and the maleimide ring, respectively were confirmed by its infrared absorption spectrum, as in Example 1.

Next, 2 parts by weight of the azine derivative of 2-methyl-imidazole was added to the prepolymer, and the metnyl Cellosolve was removed at 120° C., after which the residue was allowed to react at 170° to 200° C. for 80 minutes to obtain an insoluble and infusible cured product.

EXAMPLE 4

| (A) | 2,2'-Bis[4-(4-cyanamidophenoxy)-phenyl]propane | 60 parts by weight (0.08 mole) |
|---|---|---|
| (B) | Polyphenylmethylene polymaleimide represented by the above general formula (V) (in which n has a value of 0.8) | 40 parts by weight (0.08 mole) |

To the above-mentioned components (A) and (B) was added 0.2 part by weight of benzyldimethylamine, and the resulting mixture was mixed at 140° C. and then allowed to react at 170° to 200° C. for 80 minutes to obtain an insoluble and infusible cured product. For the cured product, absorptions due to the isomelamine ring and the maleimide ring respectively were confirmed by its IR spectrum.

EXAMPLE 5

| (A) | 4,4'-Dicyanamidodiphenylmethane | 30 parts by weight (0.084 mole) |
|---|---|---|
| (B) | 2,2-Bis[4-(4-maleimidophenoxy)-phenyl]propane | 70 parts by weight (0.084 mole) |

The above-mentioned two components were dissolved (solid content: 50% by weight) in methyl ethyl ketone and reacted at 60° to 80° C. for about 40 minutes to obtain a prepolymer which was soluble in methyl ethyl ketone, methyl Cellosolve, dimethylformamide and the like even at ordinary temperatures. Next, 0.3 part by weight of 2-ethyl-4-methylimidazole was added to the prepolymer, and the methyl Cellosolve was removed at 90° C., after which the residue was allowed to react at 170° to 200° C. for 80 minutes to obtain an insoluble and infusible cured product having isomelamine rings and maleimide rings.

Subsequently, each of the prepolymers obtained in Examples 1, 3 and 5 was dissolved in a mixed solvent of methyl ethyl ketone and methyl Cellosolve (1:1) to prepare a varnish having a concentration of 50% by weight, and each of the resin compositions in Examples 2 and 4 was dissolved in a mixed solvent of methyl ethyl ketone and N,N'-dimethylformamide (1:1) to prepare a varnish having a concentration of 50% by weight.

A glass cloth of 0.18 mm in thickness subjected to aminosilane treatment was impregnated with each of the varnishes prepared in the manner described above, and dried at 120° to 160° C. for 10 minutes to prepare a coated cloth having a resin content of about 40% by weight. Subsequently, eight plies of each of the thus prepared coated cloths were placed one on another and then laminated and attached to one another at a predetermined temperature to produce a laminated plate of about 1.6 mm in thickness.

As a comparative example, a conventional varnish having 50% by weight solids was prepared by dissolving aminobismaleimide prepolymer (m.p. 80°–90° C.) in N-methyl-2-pyrrolidone (b.p. 202° C.). Subsequently, coated cloths and a laminate were produced in the same manner as described above. As to the lamination conditions, the cure was conducted at a pressure of 80 Kg/cm² at 180° C. for 90 minutes and post-cure was then conducted at 220° C. for 180 minutes.

There are shown in Table 1 the results of measuring various characteristics of the respective resins collected from the thus prepared coated cloths and of the laminated plates. In Table 1, the initial weight loss temperature is a temperature at which weight loss began when each sample was heated in air at a heating rate of 4° C./min and its weight loss characteristics was measured. The weight loss at 500° C. is a weight loss percentage at the time when the temperature reached 500° C. The flexural strength is a retention of flexural strength at each temperature based on the flexural strength at 20° C., and the flexural strength after deterioration is a retention of flexural strength after heating and deterioration in air at 220° C. for a predetermined time, based on the initial value. The measurement temperature was room temperature (20° C.).

TABLE 1

| Molding and post-cure conditions, and characteristics | | Example 1 | 2 | 3 | 4 | 5 | Conventional Example |
|---|---|---|---|---|---|---|---|
| Molding conditions | Temperature (°C.) | 170 | 170 | 170 | 170 | 170 | 180 |
| | Time (min) | 40 | 40 | 40 | 40 | 40 | 90 |
| Post-cure conditions | Temperature (°C.) | 200 | 200 | 200 | 200 | 200 | 220 |
| | Time (min) | 40 | 100 | 40 | 40 | 40 | 180 |
| Initial weight loss temperature (°C.) | | 482 | 485 | 470 | 465 | 470 | 395 |
| Weight loss at 500° C. (%) | | 6 | 5 | 8 | 10 | 7 | 23 |
| Glass transition temperature (°C.) | | 280 | 285 | 260 | 255 | 265 | 220 |
| Flexural strength (%) | 100° C. | 95 | 96 | 95 | 94 | 95 | 95 |
| | 150° C. | 94 | 94 | 94 | 93 | 94 | 90 |
| | 200° C. | 92 | 92 | 90 | 90 | 91 | 82 |
| | 250° C. | 88 | 90 | 87 | 88 | 89 | 81 |
| Flexural strength after deterioration (%) | 500 hrs | 100 | 100 | 100 | 100 | 100 | 100 |
| | 1,000 hrs | 100 | 100 | 98 | 100 | 97 | 90 |
| | 1,500 hrs | 97 | 98 | 97 | 98 | 95 | 80 |
| | 2,000 hrs | 89 | 90 | 90 | 91 | 87 | 70 |

EXAMPLE 6

| (A) | 4,4'-Dicyanamidodiphenylmethane | 50 parts by weight (0.20 mole) |
|---|---|---|
| (B) | N,N'—4,4'-Diphenylmethane bismaleimide | 42 parts by weight (0.12 mole) |

To the above-mentioned components (A) and (B) was added 8 parts by weight (0.04 mole) of 4,4'-diaminodiphenylmethane, and the resulting mixture was allowed to react at 90° C. to 150° C. for 10 minutes to obtain a prepolymer which was soluble in methyl ethyl ketone, methyl Cellosolve, N,N'-dimethylformamide and the like. The infrared absorption spectrum of the prepolymer was measured to show an absorption due to the isomelamine ring at 1620 cm$^{-1}$ and an absorption due to the maleimide ring at 1780 cm$^{-1}$.

Next, 0.2 parts by weight of 2-ethyl-4-methylimidazole was added to the prepolymer to prepare a resin composition.

EXAMPLE 7

A composition prepared by adding 60 parts by weight (0.24 mole) of 4,4'-dicyanamidodiphenylphenylether to a prepolymer obtained by reacting 32 parts by weight (0.09 mole) of N,N'-4,4'-diphenylmethane bismaleimide with 8 parts by weight (0.04 mole) of 4,4'-diaminodiphenylmethane at 100° to 140° C. for 30 minutes, was reacted at 170° to 200° C. for 80 minutes to obtain an insoluble and infusible cured product. The infrared absorption spectrum of the cured product was measured to show an absorption due to the isomelamine ring at 1620 cm$^{-1}$ and an absorption due to the maleimide ring at 1780 cm$^{-1}$.

EXAMPLE 8

| (A) | 2,2'-Bis[4-(4-cyanamido-phenoxy)phenyl]propane | 60 parts by weight (0.08 mole) |
|---|---|---|
| (B) | N,N'—Diphenylether bismaleimide | 30 parts by weight (0.08 mole) |

To the above-mentioned components (A) and (B) was added 10 parts by weight (0.02 mole) of 2,2'-bis[4-(4-aminophenoxy)phenyl]propane, and these were further dissolved (solid content: 50% by weight) in methyl Cellosolve and reacted at 60° to 100° C. for about 40 minutes to obtain a prepolymer having isomelamine rings and maleimide rings, as in Example 6.

Next, 0.5 parts by weight of the azine derivative of 2-methyl-imidazole was added to the prepolymer to prepare a resin composition.

EXAMPLE 9

| (A) | 4,4'-Dicyanamidodiphenylmethane | 40 parts by weight (0.16 mole) |
|---|---|---|
| (B) | 2,2-Bis[4-(4-maleimidophenoxy)-phenyl]propane | 50 parts by weight (0.06 mole) |

To the above-mentioned components (A) and (B) was added 10 parts by weight (0.05 mole) of 4,4'-diaminodiphenylmethane, and the resulting mixture was mixed at 140° C. and further allowed to react at 170° to 200° C. for 120 minutes to obtain an insoluble and infusible cured product. The infrared absorption spectrum of the cured product was measured to show, as in Example 7, an absorption due to the isomelamine ring and an absorption due to the maleimide ring.

EXAMPLE 10

| (A) | 2,2'-Bis[4-(4-cyanamido-phenoxy)phenyl]propane | 40 parts by weight (0.06 mole) |
|---|---|---|
| (B) | Polyphenylmethylenepolymaleimide represented by the above general formula (V) (in which n has a value of 0.8), 52 parts by weight (0.1 mole) | |

To the above-mentioned components (A) and (B) was added 8 parts by weight (0.04 mole) of 4,4'-diaminodiphenylmethane, and the resulting mixture was mixed at 140° C. and then allowed to react at 170° to 200° C. for 120 minutes to obtain an insoluble and infusible cured product.

Next, each of the prepolymers obtained in Examples 6 to 8 was dissolved in a mixed solvent of methyl ethyl ketone and methyl Cellosolve (1:1) to prepare a varnish, and each of the resin compositions in Examples 9 and 10 was dissolved in a mixed solvent of methyl ethyl ketone and N,N-dimethylformamide (1:1) to prepare a varnish. The concentration of each of the thus obtained varnishes was 50% by weight.

By use of the aforesaid varnishes, laminated plates were produced in the same manner as described in Examples 1 to 5.

The characteristics of the thus obtained laminated plates were shown in Table 2.

TABLE 2

| Molding and post-cure conditions, and characteristics | | Example | | | | |
|---|---|---|---|---|---|---|
| | | 6 | 7 | 8 | 9 | 10 |
| Molding conditions | Temperature (°C.) | 180 | 170 | 180 | 170 | 170 |
| | Time (min) | 90 | 40 | 90 | 60 | 60 |
| Post-cure conditions | Temperature (°C.) | — | 200 | — | 200 | 200 |
| | Time (min) | — | 40 | — | 60 | 60 |
| Initial weight loss temperature (°C.) | | 450 | 455 | 445 | 440 | 445 |
| Weight loss at 500° C. (%) | | 13 | 10 | 15 | 14 | 15 |
| Glass transition temperature (°C.) | | 260 | 255 | 250 | 245 | 255 |
| Flexural strength (%) | 100° C. | 95 | 96 | 94 | 94 | 93 |
| | 150° C. | 92 | 92 | 91 | 90 | 91 |
| | 200° C. | 88 | 90 | 87 | 87 | 88 |
| | 250° C. | 86 | 87 | 85 | 83 | 84 |
| Flexural strength after deterioration (%) | 500 hrs | 100 | 100 | 100 | 100 | 100 |
| | 1,000 hrs | 97 | 98 | 97 | 96 | 97 |
| | 1,500 hrs | 90 | 92 | 91 | 90 | 91 |
| | 2,000 hrs | 80 | 83 | 83 | 81 | 82 |

EXAMPLE 11

With 16 parts by weight (0.05 mole) of N,N'-4,4'-diphenylmethane bismaleimide was reacted 4 parts by weight (0.02 mole) of 4,4'-diaminodiphenylmethane at 100° to 140° C. for 30 minutes, after which 30 parts by weight of a phenol novolak type epoxy resin (DEN-438, a trade name, epoxy equivalent 176-178; manufactured by Dow Chemical Co., U.S.A) was further added, and the resulting mixture was allowed to react at 90° C. for 30 minutes. Next, the reaction mixture was cooled to room temperature, after which 50 parts by weight (0.20 mole) of 4,4'-dicyanamidodiphenylether was added thereto to prepare a resin composition.

The procedure described above was carried out in 2-methoxyethanol. Next, the aforesaid composition was heated at 100° to 140° C. to be freed from the solvent and subjected to preliminary reaction at the same time, whereby a prepolymer was prepared. Thereafter, the prepolymer was further subjected to reaction at 170° to 200° C. for 60 minutes to obtain an insoluble and infusible cured product.

EXAMPLE 12

| (A) | 4,4'-Dicyanamidodiphenylmethane | 40 parts by weight (0.11 mole) |
|---|---|---|
| (B) | 2,2-Bis[4-(4-maleimidophenoxy)-phenyl]propane | 35 parts by weight (0.04 mole) |
| (C) | Phenol novolak resin (softening point: 75° C., the active hydrogen equivalent of phenol group: about 100), 25 parts by weight | |
| (D) | 2-Methylimidazole | 0.3 part by weight |

The above-mentioned four components were subjected to solid blending, and then reacted at 170° to 200°

EXAMPLE 13

| (A) | 4,4′-Dicyanamidodiphenylether | 40 parts by weight (0.16 mole) |
|---|---|---|
| (B) | N,N′—Diphenylmethane bismaleimide | 40 parts by weight (0.11 mole) |
| (C) | Triallyl isocyanurate | 20 parts by weight (0.08 mole) |
| (D) | Dicumyl peroxide | 0.6 part by weight |

The above-mentioned four components were dissolved in N-methyl-2-pyrrolidone and mixed, after which the solvent was removed by drying at 100° to 150° C., and the residue was reacted at 170° to 200° C. for 80 minutes to obtain an insoluble and infusible cured product.

EXAMPLE 14

With 60 parts by weight of the resin composition in Example 11 were uniformly mixed 20 parts by weight of the phenol novolak resin described above, 20 parts by weight of triallyl isocyanurate, 0.2 part by weight of 2-methyl-4-methylimidazole and 0.3 part by weight of benzoyl peroxide, after which the resulting mixture was reacted at 170° to 200° C. for 60 minutes to obtain an insoluble and infusible cured product.

The characteristics of the obtained cured product are shown in Table 3.

TABLE 3

| | | Example | | | |
|---|---|---|---|---|---|
| | | 11 | 12 | 13 | 14 |
| Cure conditions | Temperature (°C.) | 170–200 | 170–200 | 170–200 | 170–200 |
| | Time (min) | 60 | 120 | 80 | 60 |
| Initial weight loss temperature (°C.) | | 425 | 430 | 420 | 415 |
| Weight loss at 500° C. (%) | | 18 | 16 | 18 | 20 |
| Glass transition temperature (°C.) | | 235 | 230 | 260 | 235 |

What is claimed is:

1. A thermosetting resin composition comprising (A) at least one dicyanamide compound represented by the formula:

NCHN—Y—NHCN     (I)

wherein Y is a divalent organic group having an aromatic ring, (B) at least one polyvalent imide having at least two maleimide rings, and (C) at least one polymerizable compound selected from the group consisting of epoxy compounds, phenolic compounds and triallyl isocyanurate series compounds.

2. A prepolymer obtained by preliminarily reacting a composition comprising (A) at least one dicyanamide compound represented by the formula:

NCHN—Y—NHCN     (I)

wherein Y is a divalent organic group having an aromatic ring, (B) at least one polyvalent imide having at least two maleimide rings, and (C) at least one polymerizable compound selected from the group consisting of epoxy compounds, phenolic compounds, and triallyl isocyanurate series compounds, to the B stage.

3. A composition according to claim 1, wherein the amount of said dicyanamide compound is 1 to 10 moles, the amount of the polyvalent imide is 10 to 1 mole and the amount of the at least one polymerizable compound is 2 to 50% by weight.

4. A composition according to claim 1, wherein said dicyanamide compound is selected from the group consisting of 4,4′-dicyanamidodicyclohexylmethane, 1,4-dicyanamidocyclohexane, 2,6-dicyanamidopyridine, m-phenylene dicyanamide, p-phenylene dicyanamide, 4,4′-dicyanamidodiphenylmethane, 2,2′-bis(4-cyanamidophenyl)propane, 4,4′-dicyanamidophenyloxide, 4,4′-dicyanamidodiphenylsulfone, bis(4-cyanamidophenyl)phosphine oxide, bis(4-cyanamidophenyl)phenylphosphine oxide, bis(4-cyanamidophenyl)methylamine, 1,5-dicyanamidonaphthalene, m-xylylene dicyanamide, p-xylene dicyanamide, hexamethylene dicyanamide, 6,6′-dicyanamide-2,2′-dipyridyl, 4,4′-dicyanamidobenzophenone, 4,4′-dicyanamidoazobenzene, bis(4-cyanamidophenyl)phenylmethane, 1,1-bis(4-cyanamidophenyl)cyclohexane, 1,1-bis(4-cyanamido-3-methylphenyl)-1,3,4-oxadiazol, 4,4′-dicyanamidodiphenylether, 4,4′-bis(p-cyanamidophenyl)-2,2′-dithiazol, m-bis(4-p-cyanamidophenyl-2-thiazolyl)benzene, 4,4′-dicyanamidobenzanilide, 4,4′-dicyanamidophenyl benzoate, 2,2′-bis[4-(cyanamidophenoxy)phenyl]propane, 2,2′-bis[3-methyl-4-(4-cyanamidophenoxy)phenyl]propane, 2,2-bis[3-ethyl-4-(4-cyanamidophenoxy)phenyl]propane, 2,2-bis[3-propyl-4-(4-cyanamideophenoxy)phenyl]propane, 2,2-bis[3-isopropyl-4-(4-cyanamidophenoxy)phenyl]propane, bis[4-(4-cyanamidophenoxy)phenyl]methane, and a cyanamide-terminated sulfone ether oligomer represented by the following formula:

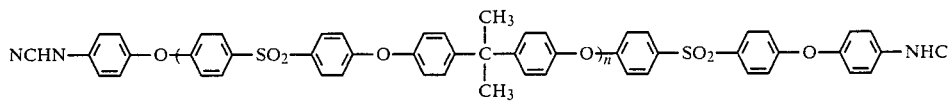
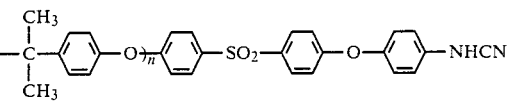

(IV)

wherein n is zero to 3.

5. A composition according to claim 4, wherein the polyvalent imide is selected from the group consisting of N,N′-methylene bismaleimide, N,N′-ethylene bismaleimide, N,N′-hexamethylene bismaleimide, N,N′-trimethylene bismaleimide, N,N′-m-phenylene bismaleimide, N,N′-p-phenylene bismaleimide, N,N′-4,4′-diphenylmethane bismaleimide, N,N′-4,4′-diphenylether bismaleimide, N,N′-methylene bis(3-chloro-p-phenylene)bismaleimide, N,N′-4,4′-diphenylsulfone bismaleimide, N,N′-4,4′-dicyclohexylmethane bismaleimide, N,N′-α,α′-4,4′-dimethylene cyclohexane bismaleimide, N,N′-m-xylene bismaleimide, N,N′-4,4′-diphenylcyclohexane bismaleimide and a polyimide represented by the following formula:

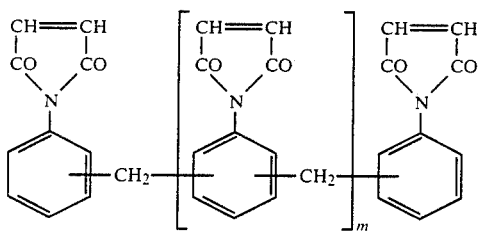

wherein m is zero to 3.

6. A prepolymer according to claim 2, wherein the amount of said dicyanamide compound is 1 to 10 moles, the amount of the polyvalent imide is 10 to 1 mole and the amount of the at least one polymerizable compound is 2 to 50% by weight.

7. A prepolymer according to claim 2, wherein said dicyanamide compound is selected from the group consisting of 4,4'-dicyanamidodicyclohexylmethane, 1,4-dicyanamidocyclohexane, 2,6-dicyanamidopyridine, m-phenylene dicyanamide, p-phenylene dicyanamide, 4,4'-dicyanamidodiphenylmethane, 2,2'-bis(4-cyanamidopnenyl)propane, 4,4'-dicyanamidophenyloxide, 4,4'-dicyanamidodiphenylsulfone, bis(4-cyanamidophenyl)phosphine oxide, bis(4-cyanamidophenyl)phenylphosphine oxide, bis(4-cyanamidophenyl)methylamine, 1,5-dicyanamidonaphthalene, m-xylylene dicyanamide, p-xylene dicyanamide, hexamethylene dicyanamide, 6,6'-dicyanamide-2,2'-dipyridyl, 4,4'-dicyanamidobenzophenone, 4,4'-dicyanamidoazobenzene, bis(4-cyanamidophenyl)phenylmethane, 1,1-bis(4-cyanamidophenyl)cyclohexane, 1,1-bis(4-cyanamido-3-methylphenyl)-1,3,4-oxadiazol, 4,4'-dicyanamidodiphenylether, 4,4'-bis(p-cyanamidophenyl)-2,2'-dithiazol, m-bis(4-p-cyanamidophenyl-2-thiazolyl)benzene, 4,4'-dicyanamidobenzanilide, 4,4'-dicyanamidophenyl benzoate, 2,2'-bis[4-(cyanamidophenoxy)phenyl]propane, 2,2'-bis[3-methyl-4-(4-cyanamidophenoxy)phenyl]propane, 2,2-bis[3-ethyl-4-(4-cyanamidophenoxy)phenyl]propane, 2,2-bis[3-propyl-4-(4-cyanamideophenoxy)phenyl]propane, 2,2-bis[3-isopropyl-4-(4-cyanamidophenoxy)phenyl]propane, bis[4-(4-cyanamidophenoxy)phenyl]methane, and a cyanamide-terminated sulfone ether oligomer represented by the following formula:

8. A prepolymer according to claim 7, wherein the polyvalent imide is selected from the group consisting of N,N'-methylene bismaleimide, N,N'-ethylene bismaleimide, N,N'-hexamethylene bismaleimide, N,N'-trimethylene bismaleimide, N,N'-m-phenylene bismaleimide, N,N'-p-phenylene bismaleimide, N,N'-4,4'-diphenylmethane bismaleimide, N,N'-4,4'-diphenylether bismaleimide, N,N'-methylene bis(3-chloro-p-phenylene)bismaleimide, N,N'-4,4'-diphenylsulfone bismaleimide, N,N'-4,4'-dicyclohexylmethane bismaleimide, N,N'-α,α'-4,4'-dimethylene cyclohexane bismaleimide, N,N'-m-xylene bismaleimide, N,N'-4,4'-diphenylcyclohexane bismaleimide and a polyimide represented by the following formula:

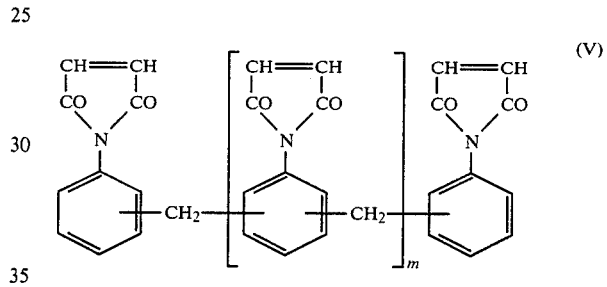

wherein m is zero to 3.

* * * * *